April 7, 1959 R. C. PERSONS ET AL 2,880,919
ARTICLE CARRIER FOR BICYCLES
Filed Sept. 30, 1957
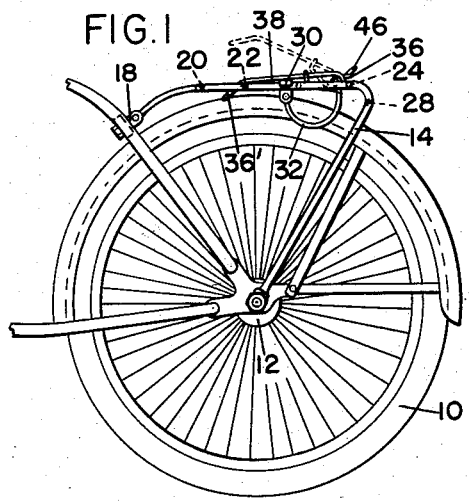
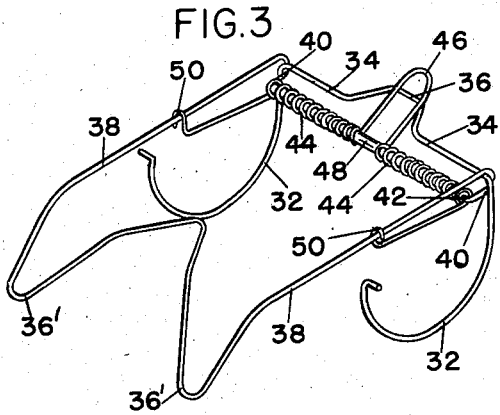
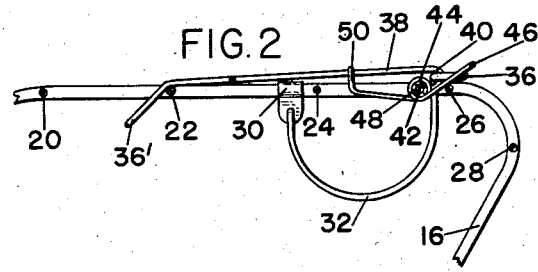
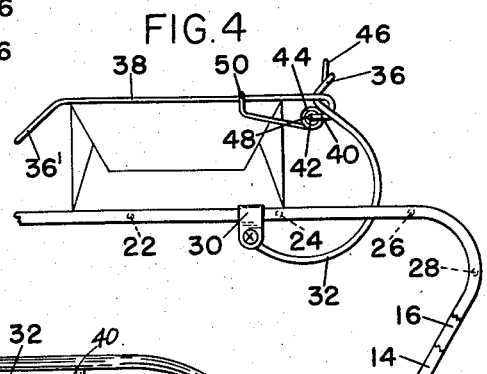
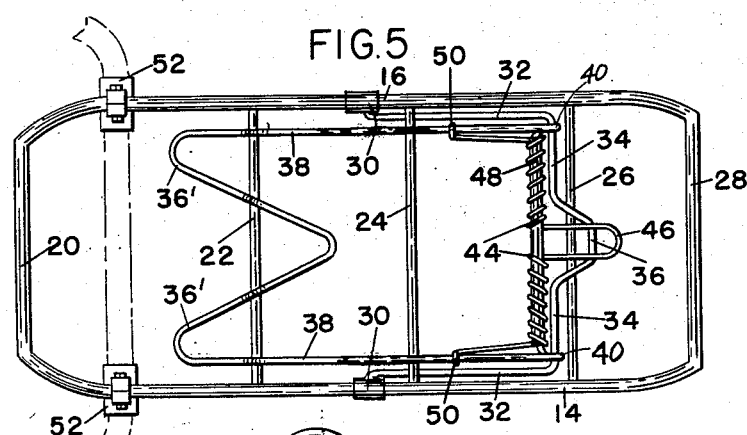
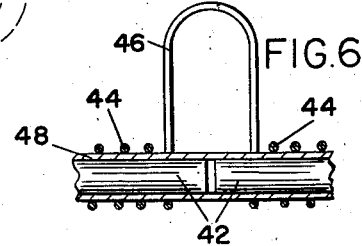
INVENTORS
ROBERT C. PERSONS
+ MAURICE J. WALSH
BY
ATTORNEY

United States Patent Office 2,880,919
Patented Apr. 7, 1959

2,880,919

ARTICLE CARRIER FOR BICYCLES

Robert C. Persons and Maurice J. Walsh, Worcester, Mass., assignors to Persons-Majestic Mfg. Company, Worcester, Mass., a corporation of Massachusetts Application September 30, 1957, Serial No. 686,904

4 Claims. (Cl. 224—38)

This invention relates to a new and improved carrier for use on bicycles, and the principal object of the invention includes the provision of a carrier which may be conveniently mounted as for instance on the rear mud-guard, or at the front of the bicycle, and embodies a frame having means forming a supporting surface, in combination with a particular new and improved spring clamping device which acts in a direction to hold articles to the clamping surface of the carrier.

Further objects of the invention include a carrier for the purpose above described in which the clamping device comprises two main parts, both of which are conveniently made of bent wire, one part including a pair of spaced arcuate legs having terminal portions pivotally attached to the carrier frame, said arcuate legs being normally located below the supporting surface and extending upwardly and passing through the supporting surface, said legs being pivotable upwardly to a position substantially above the supporting surface; and the provision of a second clamping part which is articulated with respect to the first part above described and including spring means associated with and between said parts, said spring means normally tending to maintain the second part flatly down upon the supporting surface and the first, arcuate part below the latter, whereby when the arcuate part is raised, the second part may be maintained in substantially parallel relation to the clamping surface; and the spring means is arranged in such a way as to tend to draw the objects clamped thereon down upon the clamping surface and also in a direction to be more firmly clamped.

A further object of the invention resides in the provision of the articulated spring-actuated clamping device on the carrier frame as above stated and including means on the carrier limiting the motion of both of said clamping parts in a clamping direction, positively preventing the same from being forced into an unwanted or awkward position to the rear of the carrier as might otherwise be the case.

Other objects and advantages will be hereinafter described including a form of the invention for application to the handle-bars of the bicycle.

Reference is to be had to the accompanying drawings, in which

Fig. 1 is a partial view of the rear wheel of a bicycle showing the carrier attached thereto;

Fig. 2 is a longitudinal sectional view on a larger scale illustrating the carrier in flat condition;

Fig. 3 is a perspective view showing the main parts of the carrier;

Fig. 4 is an elevational view showing how the carrier appears in use;

Fig. 5 is a plan view illustrating a modification adapted for attachment to the handle-bars; and Fig. 6 is a section illustrating a part of the spring.

In carrying out the present invention, the same has been illustrated in Fig. 1 as applied to the rear wheel of a bicycle or similar vehicle, this wheel having been indicated at 10. The wheel has a hub at 12 upon which a pair of wire supporting members 14 and 16 are mounted. These wire supporting members extend rearwardly upwardly at an angle and then extend toward the front, terminating in a bracket indicated at 18 for securement to some portion of the vehiclie adjacent the rear of the saddle such as the rear fork or the mud-guard. The two wire members 14 and 16 are relatively strong and rigid and are spaced apart as clearly seen in Fig. 5. Between them there are provided a series of cross bars which are indicated at 20, 22, 24, 26 and 28. Certain of these bars may be used to support articles on the carrier in concert with the horizontal top runs of the members 14 and 16.

Just forwardly of the cross bar 24, there is a bracket or the like 30, there being one bracket on each member 14 and 16. A pair of wire members have bent ends projected through apertures in these brackets, these wire members being generally formed on the arc of a circle as illustrated at 32, there being one of these formed arcs at each side of the carrier, see particularly Fig. 3.

The two arc-shaped portions 32 extend upwardly and inwardly toward the center of the frame as indicated at 34 (see Fig. 5) and come together in a generally rearwardly extending offset portion 36. It will be seen that the in-turned ends of the wire members 32 provide a pivot axis for the raising and lowering of this member between Fig. 2 and Fig. 4 positions. These wire members may be made from a single wire.

A second wire member extends well forwardly of the cross member 24 and terminates in a downwardly bent lip construction 36' which normally rests on the cross member 22, the latter stopping the second wire member in this position. The second wire member is the clamping member of the clamping device. From the forward lips 36', the second wire member extends rearwardly as at 38, 38 in a pair of spaced runs, and toward the rear thereof they extend over and about the wire member 32 at the portions 34 thereof as illustrated at 40. Thence this wire member turns inwardly to form a cross member 42 about which is coiled a spring 44, 44. Spring 44 has a rearwardly extending loop 46 which rests upon the offset portion 36 between the members 34 of the first described wire member. The spring is coiled so that loop 46 bears rearwardly down upon the offset 36 and holds the parts in the Fig. 2 position. In order to assemble these parts, the wire member at 42 may be split and the ends secured by means of a sleeve or the like which is illustrated at 48 in Fig. 2.

The ends of the spring members 44, 44 extend downwardly and forwardly and terminate in upstanding downward opening hook ends 50 extending over the side runs 38, 38 of the forwardly extending clamping member, thus holding this member down in the inoperative Fig. 2 position as well as holding the same down upon an object on the supporting surface of the carrier as shown in full lines in Fig. 4.

If desired, the cross member 20 may form the terminal portion of the carrier at the left-hand end thereof in Fig. 5 and any kind of bracket members 52 may be applied to the side runs 14 and 16 in order to mount the same upon the handle-bars, with the carrier extending generally either forward or backwards from the handle-bars as may be desired by the user.

In the Fig. 2 position, it will be seen that the offset 36 rests upon cross member 26 which forms a stop for it, preventing the same from descending any lower in spite of the action of the spring, and the loop 46 bears down upon the offset 36 holding the parts in this position.

However, the operator may raise the clamping member to the Fig. 4 position and when this is done, the loop 46 of the spring 44 is rotated in a direction to tension the same and apply a further resilient pressure thereto tending to bring the clamping member 38, 38 down upon the supporting surface of the carrier. At the same time, due to the construction of the arc-shaped members 32, this action is directed also to the rear, so that the lips at 36' and in fact the entire hold-down device, act to securely hold an article therein and do not tend to force the article out of the carrier at the front end.

However, as shown in Fig. 1, the hold-down member 38, 38 may merely pivot about the in-turned members 34, 34 as an axis to hold small articles such as bathing-suits, etc. without the necessity of actually pulling up the arc-shaped members 32.

In no case, however, is the clamp able to fold backwardly in under the carrier frame as a whole, being positively stopped by cross member 26. All the parts are conveniently made of wire or the like and therefore a very positive fast-acting hold-down type carrier is provided at the least expense possible, the same being very simple to manufacture and easy to mount on the bicycle either at the rear or the front thereof as above described.

Having thus described our invention and the advantages thereof, we do not wish to be limited to the details herein disclosed, otherwise than as set forth in the claims, but what we claim is:

1. A carrier of the class described comprising an elongated frame adapted to be mounted on a bicycle, elements on said frame forming a clamping surface, an elongated member pivoted at one end to said frame on an axis transverse to the frame and normally extending below the clamping surface, said elongated member extending down and away from the pivot axis thereof in a plane parallel to the length of the frame, a portion of said elongated member extending transversely and inwardly across the frame and engaging a part of said frame in one extreme position thereof, a clamping member pivotally mounted on said inwardly extending portion of the elongated member and extending toward the other end of the frame and normally resting on a part of the supporting surface, a coil spring engaging said clamping member maintaining the same in downward position on said clamping surface, said spring having an extending central portion engaged with the inwardly extending portion of the elongated member and yieldably holding the latter in its downwardmost position, inwardly directed end portions on the clamping member extending toward each other, and a loose sleeve connecting the said end portions, the spring having a coiled part on the sleeve.

2. A carrier of the class described comprising a frame adapted to be mounted on a bicycle, elements on said frame forming a clamping surface, a bent wire clamping member pivoted at one end to said frame and normally extending substantially below the clamping surface, said bent wire member extending arcuately downwardly and rearwardly away from the pivot axis, and then upwardly, a portion of said bent wire member extending inwardly over and across the clamping surface of the frame and resting upon and limited in its downward pivoting motion by engaging a part of said frame in one extreme position thereof, a second calmping member pivotally mounted on said inwardly extending portion of the bent wire member and extending forwardly toward the other end of the frame and normally resting on an element forming a portion of the clamping surface, a spring having a part thereof pressing on said second member, yieldingly maintaining the same in downward position on said clamping surface, said spring having an extending resilient portion engaged with the inwardly extending portion of the bent wire member and yieldably holding the latter in its downwardmost position, the clamping members being adapted to be generally raised from the clamping surface to clamp an object thereto, but being held against any further downward motion by the elements forming the clamping surface.

3. The carrier as recited in claim 2 wherein the extending portion of said spring is in the form of a loop constantly bearing upon the inwardly extending portion of said arcuate bent wire member.

4. The carrier as stated in claim 2 including an offset portion on said inwardly extending portion of the bent wire member, a part of the spring being in the form of a loop constantly resting on said offset portion to yieldably holding the two clamping members in their downwardmost position.

References Cited in the file of this patent

FOREIGN PATENTS

| 56,691 | France | July 23, 1952 |
| 226,143 | Switzerland | June 16, 1943 |
| 589,519 | Great Britain | June 23, 1947 |
| 801,128 | Germany | Dec. 21, 1950 |